United States Patent
Park et al.

(10) Patent No.: US 9,825,682 B2
(45) Date of Patent: Nov. 21, 2017

(54) METHOD FOR REPORTING CHANNEL STATE INFORMATION FOR THREE-DIMENSIONAL BEAM FORMING IN WIRELESS COMMUNICATION SYSTEM AND APPARATUS THEREFOR

(71) Applicant: LG ELECTRONICS INC., Seoul (KR)

(72) Inventors: Jonghyun Park, Anyang-si (KR); Hyungtae Kim, Anyang-si (KR); Hanjun Park, Anyang-si (KR); Hanbyul Seo, Anyang-si (KR); Kijun Kim, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/409,924

(22) PCT Filed: Jul. 2, 2013

(86) PCT No.: PCT/KR2013/005853
§ 371 (c)(1),
(2) Date: Dec. 19, 2014

(87) PCT Pub. No.: WO2014/007511
PCT Pub. Date: Jan. 9, 2014

(65) Prior Publication Data
US 2015/0139112 A1 May 21, 2015

Related U.S. Application Data

(60) Provisional application No. 61/667,925, filed on Jul. 3, 2012, provisional application No. 61/752,420, filed on Jan. 14, 2013.

(51) Int. Cl.
*H04L 12/26* (2006.01)
*H04B 7/06* (2006.01)
(Continued)

(52) U.S. Cl.
CPC ......... *H04B 7/0626* (2013.01); *H04B 7/0413* (2013.01); *H04B 7/0478* (2013.01);
(Continued)

(58) Field of Classification Search
USPC .................. 370/241, 252, 328, 329, 334
See application file for complete search history.

(56) References Cited

U.S. PATENT DOCUMENTS

2009/0274109 A1\* 11/2009 Zhang .................. H04L 1/1614
370/329
2011/0199921 A1\* 8/2011 Damnjanovic ..... H04W 52/367
370/252

(Continued)

OTHER PUBLICATIONS

Alcatel-Lucent Shanghai Bell et al., "Considerations on CSI feedback enhancements for high-priority antenna configurations," 3GPP TSG-RAN WG1 #66, R1-112420, Athens, Greece, Aug. 22-26, 2011, pp. 1-7.\*

(Continued)

*Primary Examiner* — Kwang B Yao
*Assistant Examiner* — Nguyen Ngo
(74) *Attorney, Agent, or Firm* — Birch, Stewart, Kolasch & Birch, LLP

(57) ABSTRACT

A method and user equipment (UE) are provided for reporting channel state information (CSI). The UE supports massive multiple-input multiple-output (MIMO) technology in a wireless communication system. The UE receives, from an eNode B, M port CSI reference signals through a plurality of antenna ports composed of an L×M array, where L corresponds to a number of antenna ports in a horizontal direction and M corresponds to a number of antenna ports in (Continued)

a vertical direction. The UE selects a vertical antenna port by comparing energy of the M port CSI reference signals, and calculates a rank indicator (RI), precoding matrix indicator (PMI), and a channel quality indicator (CQI) of the selected vertical antenna port based on the M port CSI reference signals. The UE transmits the calculated RI, the calculated PMI and the calculated CQI to the eNode B.

12 Claims, 15 Drawing Sheets

(51) Int. Cl.
*H04B 7/0413* (2017.01)
*H04B 7/10* (2017.01)
*H04L 5/00* (2006.01)
*H04B 7/04* (2017.01)

(52) U.S. Cl.
CPC ......... *H04B 7/0619* (2013.01); *H04B 7/0632* (2013.01); *H04B 7/0639* (2013.01); *H04B 7/10* (2013.01); *H04L 5/0053* (2013.01); *H04L 5/0023* (2013.01); *H04L 5/0048* (2013.01); *H04L 5/0057* (2013.01)

(56) References Cited

U.S. PATENT DOCUMENTS

| | | | | |
|---|---|---|---|---|
| 2011/0319025 | A1* | 12/2011 | Siomina | H04B 7/024 455/63.1 |
| 2012/0002612 | A1* | 1/2012 | Baker | H04B 7/0417 370/328 |
| 2013/0259151 | A1* | 10/2013 | Thomas | H04L 25/03949 375/267 |
| 2013/0308715 | A1* | 11/2013 | Nam | H04B 7/0469 375/267 |
| 2013/0329664 | A1* | 12/2013 | Kim | H04W 24/10 370/329 |
| 2014/0029684 | A1* | 1/2014 | Shirani-Mehr | H04B 7/0469 375/267 |
| 2014/0334333 | A1* | 11/2014 | Xu | H04B 7/024 370/252 |
| 2015/0003240 | A1* | 1/2015 | Drwiega | H04L 65/1069 370/230 |
| 2015/0078472 | A1* | 3/2015 | Vook | H04B 7/0617 375/267 |
| 2015/0098516 | A1* | 4/2015 | Wang | H04B 7/0469 375/267 |
| 2015/0124736 | A1* | 5/2015 | Ko | H04B 7/0626 370/329 |
| 2015/0215023 | A1* | 7/2015 | Thurfjell | H04B 7/046 375/295 |

OTHER PUBLICATIONS

Alcatel-Lucent, "Deployment Scenarios and Assumptions," 3GPP TSG RAN WG4 Meeting #63, R4-123072, Prague, Czech Republic, May 21-25, 2012, pp. 1-3.

Motorola Mobility, "Scenario and Modeling Discussion for DL-MIMO Enhancement," 3GPP TSG RAN1 #66, R1-112444, Athens, Greece, Aug. 22-26, 2011, pp. 1-4.

Samsung, "Prioritization of CSI feedback enhancement scenarios for DL-MIMO," 3GPP TSG RAN WG1 Meeting #66, R1-112515, Athens, Greece, Aug. 22-26, 2011, pp. 1-3.

ZTE, "Considerations of system coexistence simulation for AAS," 3GPP TSG-RAN WG4 Meeting #61, R4-115575, San Francisco, USA, Nov. 14-18, 2011, pp. 1-5.

* cited by examiner

FIG. 2
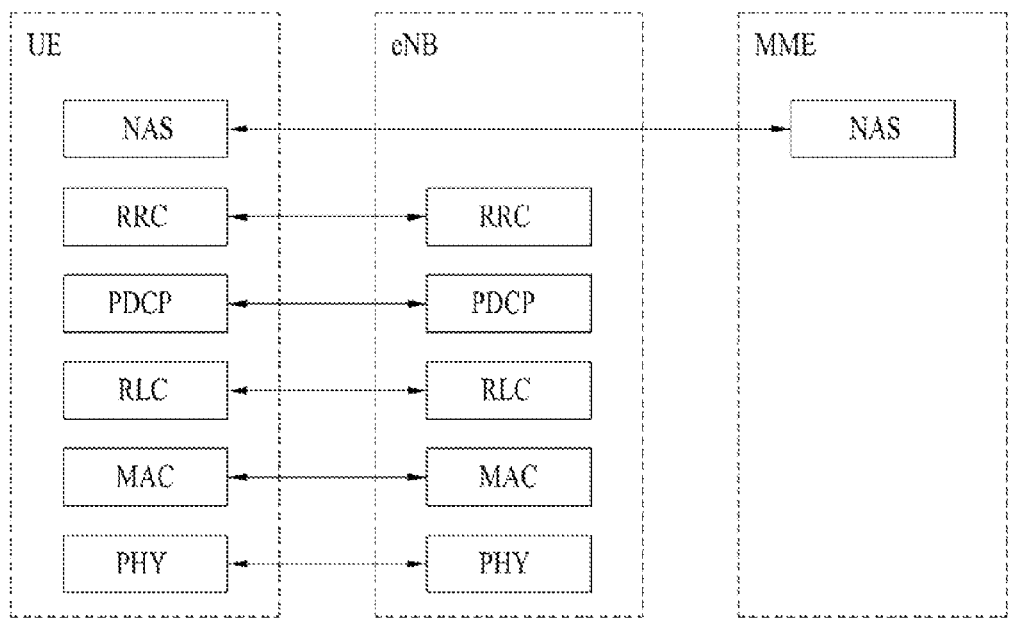
(a) control plane protocol stack
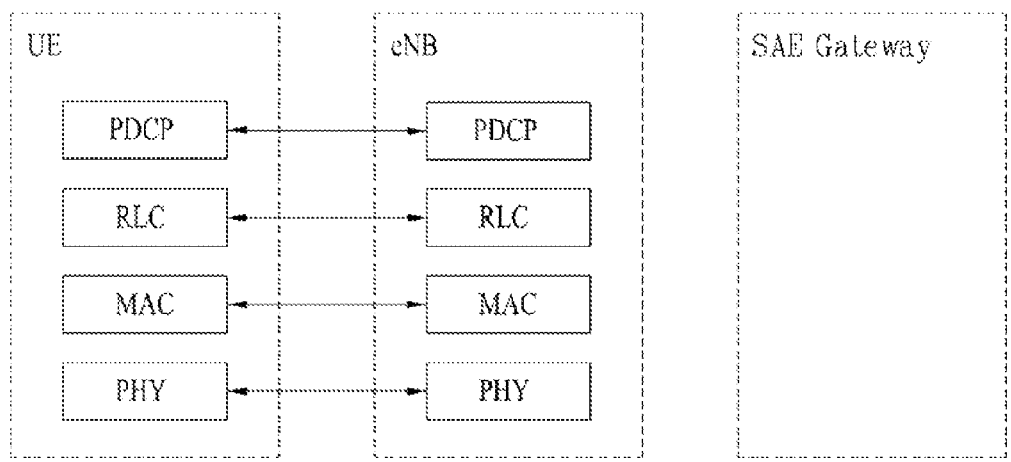
(b) user plane protocol stack ▨ : DMRS group 1

▧ : DMRS group 2

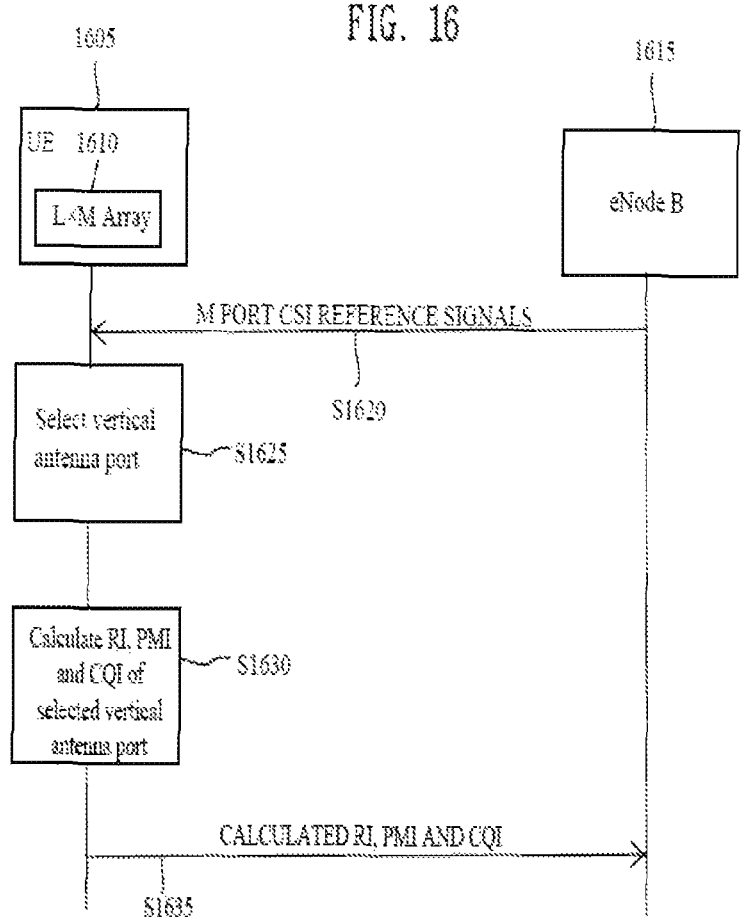

US 9,825,682 B2

METHOD FOR REPORTING CHANNEL STATE INFORMATION FOR THREE-DIMENSIONAL BEAM FORMING IN WIRELESS COMMUNICATION SYSTEM AND APPARATUS THEREFOR

CROSS REFERENCE TO RELATED APPLICATIONS

This application is the National Phase of PCT International Application No. PCT/KR2013/005853, filed on Jul. 2, 2013, which claims priority under 35 U.S.C. 119(e) to U.S. Provisional Application No. 61/667,925, filed on Jul. 3, 2012 and 61/752,420, filed on Jan. 14, 2013, all of which are hereby expressly incorporated by reference into the present application.

TECHNICAL FIELD

The present invention relates to a wireless communication system, and more particularly, to a method of reporting channel state information for 3 dimensional beamforming in a wireless communication system and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of reporting channel state information for 3 dimensional beamforming in a wireless communication system and an apparatus therefor in the following description based on the discussion mentioned earlier in the foregoing description.

Technical Solution

To achieve these and other advantages and in accordance with the purpose of the present invention, as embodied and broadly described, according to one embodiment, a method of reporting channel state information, which is reported by a user equipment to support a massive MIMO (multiple-input multiple-output) in a wireless communication system, include the steps of receiving first reference signal information corresponding to antenna ports in vertical direction and second reference signal information corresponding to antenna ports in horizontal direction from an eNode B, transmitting information on a specific antenna port among the antenna ports in the vertical direction to the eNode B using the first reference signal information and transmitting channel state information in horizontal direction to the eNode B using the second reference signal information. The method can further include the step of receiving a confirmation message for the specific antenna port from the eNode B.

Preferably, a reception period of the first reference signal information may be longer than a reception period of the second reference signal information. And, the information on the specific antenna port and the channel state information in the horizontal direction can be transmitted to the eNode B in a manner of being combination encoded.

More preferably, the information on the specific antenna port includes information on a beam direction in vertical direction.

And, the channel state information includes at least one selected from the group consisting of an RI (rank indicator), a PMI (precoding matrix index) and a CQI (channel quality indicator). In this case, the eNode B can correct the CQI received from the user equipment by reflecting the information on the beam direction in the vertical direction in the CQI. Or, the user equipment can generate the channel state information in a manner of reflecting the information on the beam direction in the vertical direction.

Moreover, the method can further include the step of transmitting a PMI (precoding matrix) in vertical direction restricted to a rank 1 to the eNode B based on the first reference signal information.

To further achieve these and other advantages and in accordance with the purpose of the present invention, according to a different embodiment, a user equipment supporting a massive MIMO (multiple-input multiple-output) in a wireless communication system can include a wireless communication module configured to transceive a signal with an eNode B, a processor configured to process the signal, the processor configured to control the wireless communication module to generate information on a specific antenna port among antenna ports in vertical direction using first reference information among the first reference signal information corresponding to the antenna ports in vertical direction and second reference signal information corresponding to antenna ports in horizontal direction received from the eNode B, generate channel state information in horizontal direction using the second reference signal information and report the information on the specific antenna port and the channel state information to the eNode B.

Advantageous Effects

According to embodiment of the present invention, it is able to efficiently report channel state information for 3 dimensional beamforming in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram for structures of control and user planes of radio interface protocol between a 3GPP radio access network standard-based user equipment and E-UTRAN;

FIG. 16 is a diagram illustrating a method for reporting channel state information (CSI) according to one embodiment of the present invention.

BEST MODE

Mode for Invention

Figure 1:
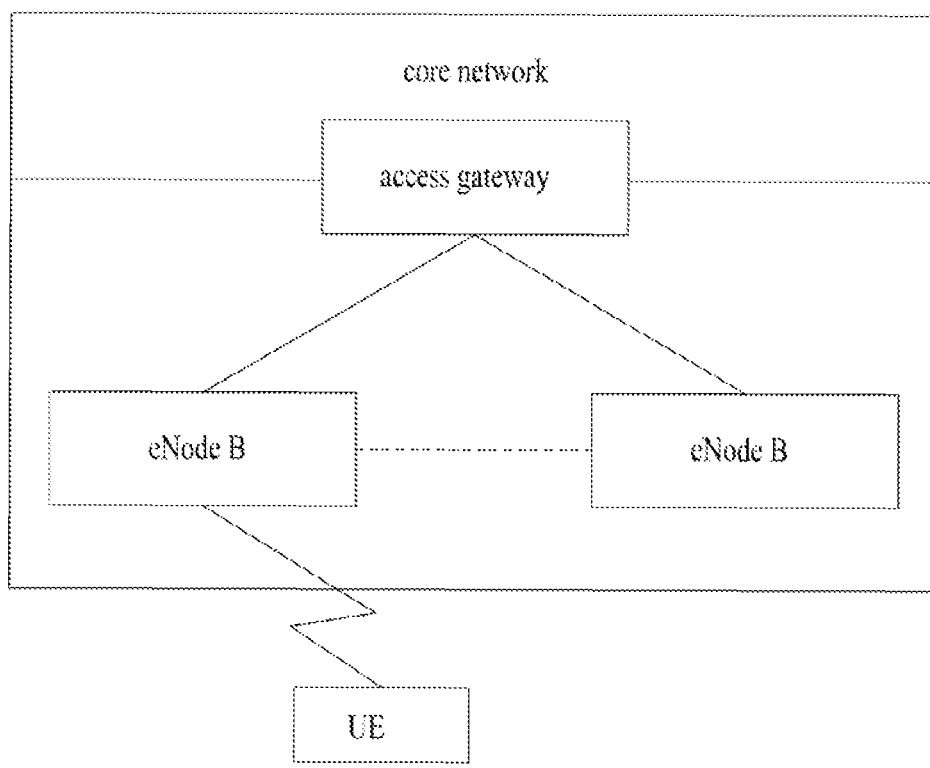
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3$^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2$^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
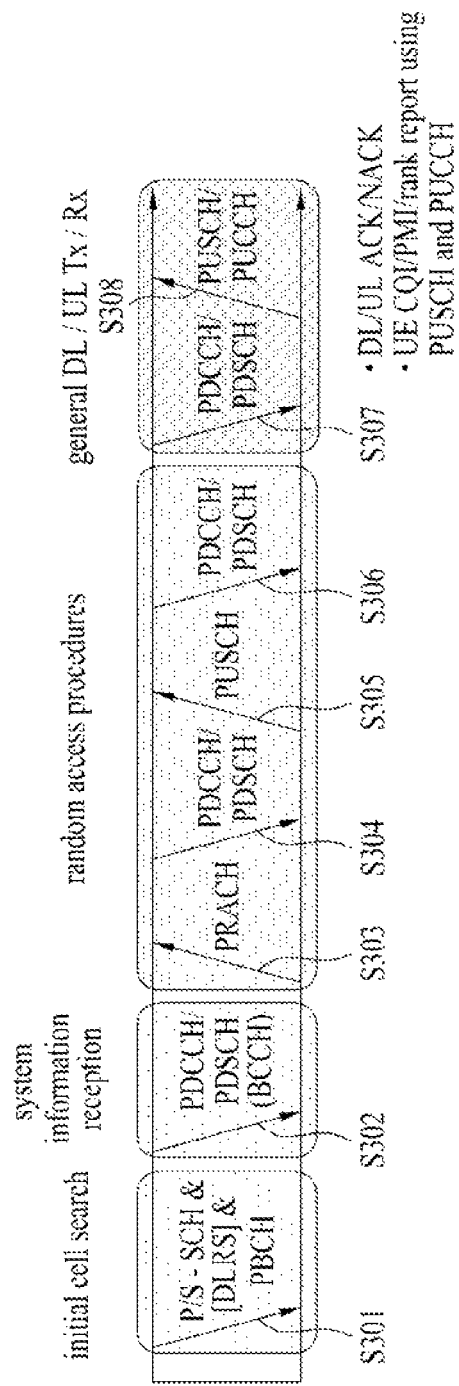
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
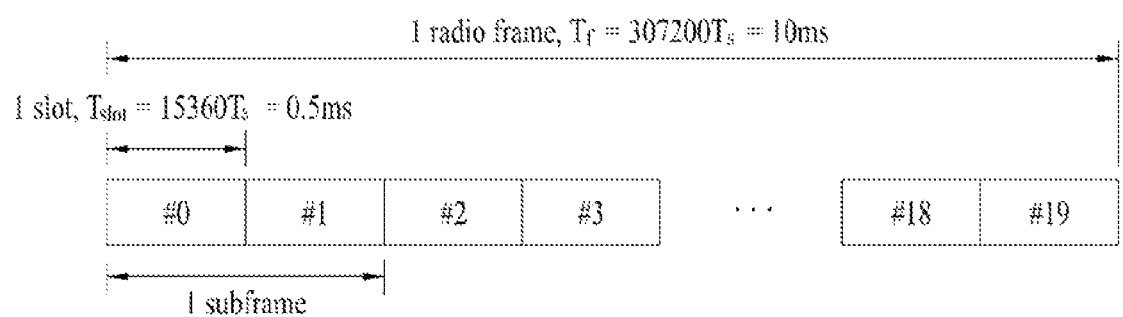
FIG. 4 is a diagram for a structure of a radio frame in LTE system.

FIG. 4 is a diagram for a structure of a radio frame in LTE system.

Referring to FIG. 4, one radio frame has a length of 10 ms ($327,200 \times T_s$) and is constructed with 10 subframes in equal size. Each of the subframes has a length of 1 ms and is constructed with two slots. Each of the slots has a length of 0.5 ms ($15,360 \times T_s$). In this case, $T_s$ indicates a sampling time and is represented as $T_s=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
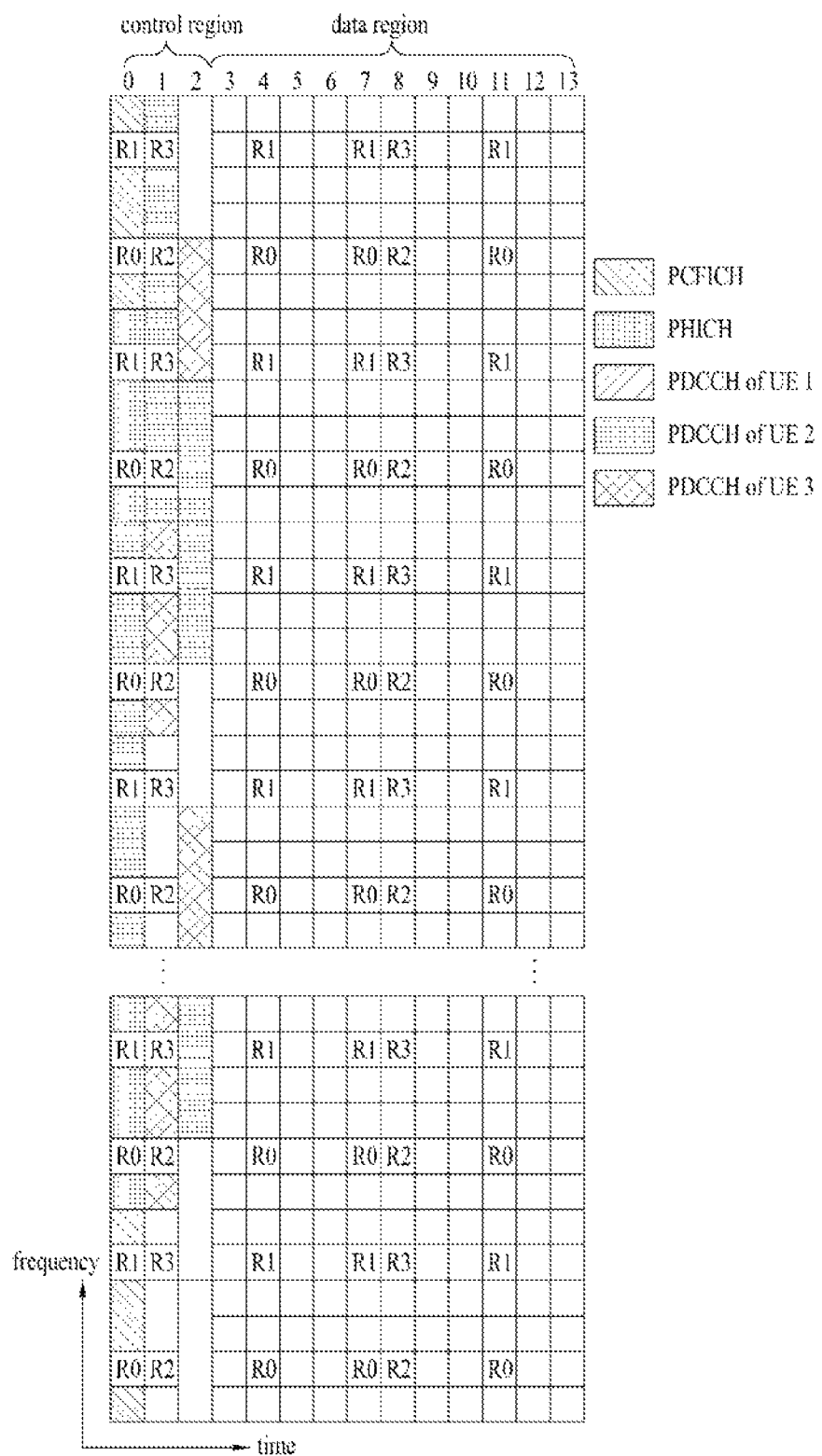
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
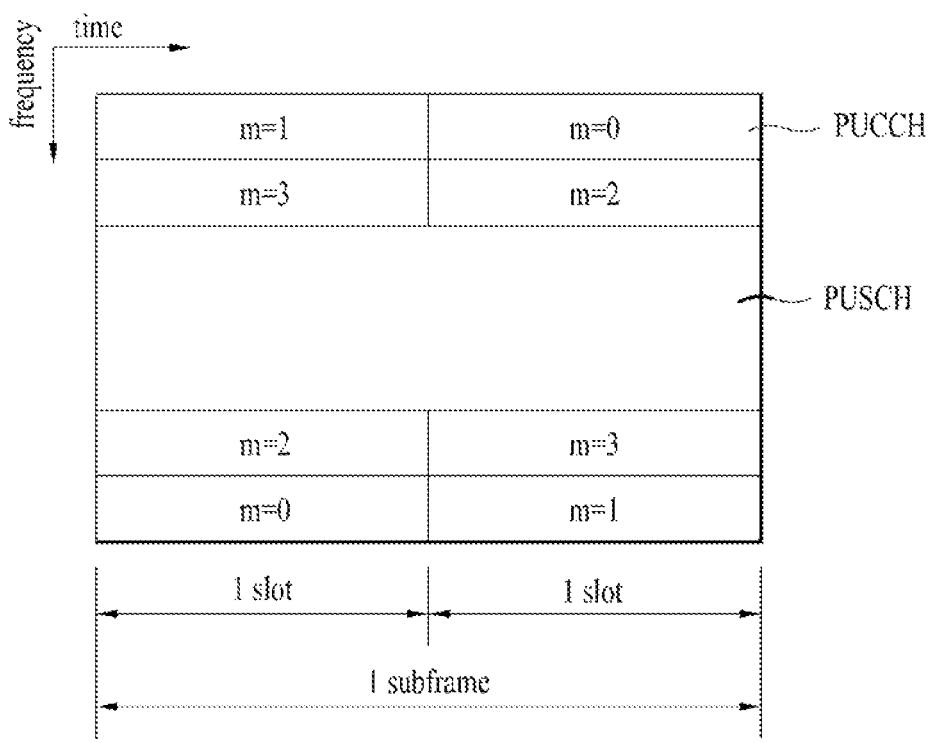
FIG. 6 is a diagram for a structure of an uplink subframe frame in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 7:
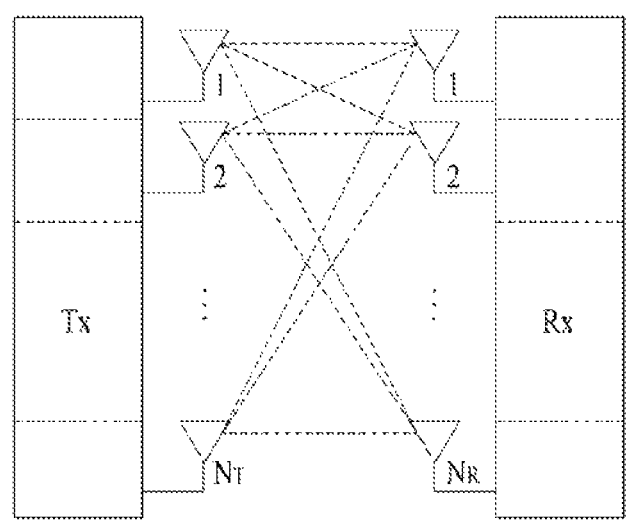
FIG. 7 is a diagram for a configuration of a multiple antenna communication system.

A block diagram of a general multi-antenna (MIMO) communication system is depicted in FIG. 7. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Formula 1. In this case, the $R_i$ is a smaller value of the $N_T$ and the $N_R$.

$$R_i = \min(N_T, N_R) \qquad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 2.

$$s = [s_1, s_2, \ldots, s_{N_T}]^T \quad \text{[Formula 2]}$$

Meanwhile, for each of the transmission informations $s_1$, $s_2$, . . . , $S_{N_T}$, a transmit power may be differentiated according to the each of the transmission informations. In this case, if each of the transmit powers is represented as $P_1$, $P_2$, . . . , $P_{N_T}$, transmit power-adjusted transmission information can be represented as a vector in the following Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, if $\hat{s}$ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots x_{N_T}$, which is practically transmitted, is configured in a manner of applying a weighted matrix W to the adjusted information vectors $\hat{s}$. In this case, the weighted matrix performs a role of distributing the transmission information to each of the antennas according to the situation of the transmission channel and the like. The transmission signal $x_1, x_2, \ldots x_{N_T}$ can be represented using a vector X in the following Formula 5. In this case, $W_{ij}$ means a weighting between an $i^{th}$ transmitting antenna and $j^{th}$ information. The W is called the weighted matrix or a precoding matrix.

$$x = \begin{bmatrix} x_1 \\ x_2 \\ \vdots \\ x_i \\ \vdots \\ x_{N_T} \end{bmatrix} \quad \text{[Formula 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \quad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams} \leq \text{rank}(H) \leq \min(N_T, N_R) \quad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

In the following description, a reference signal is explained in more detail.

In general, a reference signal, which is already known to both a transmitting end and a receiving end, is transmitted from the transmitting end to the receiving end together with data to measure a channel. The reference signal plays not only a role of measuring a channel but also a role of making a demodulation process to be performed in a manner of informing the receiving end of a modulation scheme. The reference signal is classified into a dedicated reference signal (DRS) used for an eNB and a specific user equipment (i.e., UE-specific reference signal) and a cell-specific reference signal used for all UEs in a cell (i.e., common reference signal or cell specific RS (CRS)). The cell-specific reference signal includes a reference signal used for reporting CQI/PMI/RI to an eNB in a manner of measuring CQI/PMI/RI in a user equipment. This sort of reference signal is called a CSI-RS (channel state information-RS).

Figure 8:
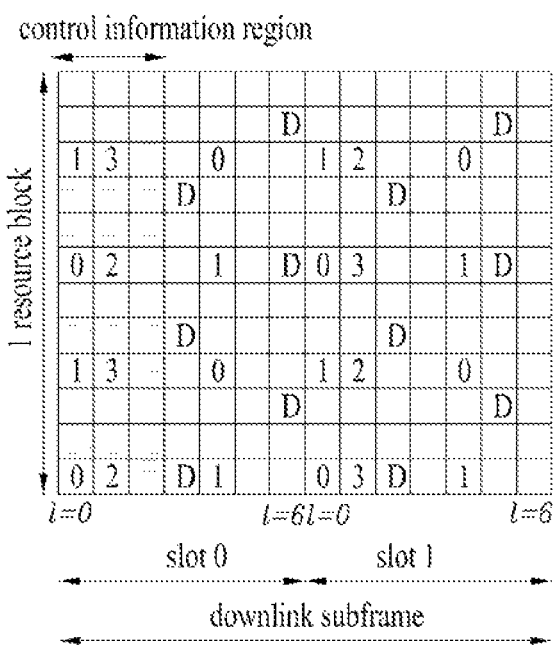
FIG. 8 and FIG. 9 are diagrams for a structure of a downlink reference signal in LTE system supportive of downlink transmission using 4 antennas.
Figure 9:
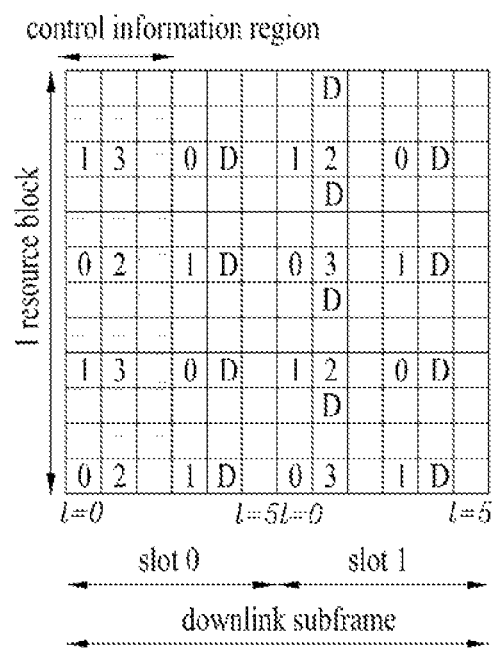

FIG. 8 and FIG. 9 are diagrams of a structure of a reference signal in LTE system supportive of downlink transmission using 4 antennas. In particular, FIG. 8 shows a case of a normal cyclic prefix and FIG. 9 shows a case of an extended cyclic prefix.

Referring to FIG. 8 and FIG. 9, 0 to 3 written on a grid may mean the CRS (common reference signal), which is a cell-specific reference signal, transmitted for the channel measurement and the data demodulation in a manner of corresponding to antenna port 0 to 3, respectively. The cell-specific reference signal CRS can be transmitted to a user equipment via the control information region as well as the data information region.

And, 'D' written on the grid may mean a downlink DM-RS (demodulation RS), which is a user-specific RS. The DM-RS supports a single antenna port transmission via the data region, i.e., the PDSCH. The user equipment is signaled whether the DM-RS, which is the user equipment-specific RS, exists or not via an upper layer. FIG. 8 and FIG. 9 show an example of the DM-RS corresponding to an antenna port 5. The DM-RSs corresponding to an antenna port 7 to 14, i.e., total 8 antenna ports, are also defined by 3GPP standard document 36.211.

Figure 10:
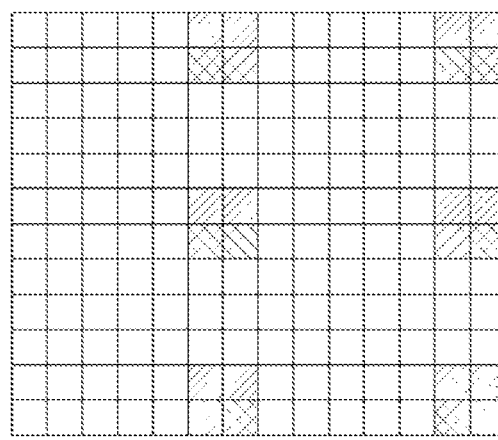
FIG. 10 is a diagram for an example of assigning a downlink DM-RS defined by a current 3GPP standard document.

FIG. 10 is a diagram for an example of assigning a downlink DM-RS defined by a current 3GPP standard document.

Referring to FIG. 10, DM-RSs corresponding to antenna ports {7, 8, 11, 13} are mapped to a DM-RS group 1 using a sequence according to an antenna port and DM-RSs corresponding to antenna ports {9, 10, 12, 14} are mapped to a DM-RS group 2 using a sequence according to an antenna port as well.

Meanwhile, the aforementioned CSI-RS is proposed to perform channel measurement for PDSCH irrespective of a CRS. Unlike the CRS, the CSI-RS can be defined by maximum 32 CSI-RS configurations different from each other to reduce inter-cell interference (ICI) in a multicell environment.

A CSI-RS configuration varies according to the number of antenna ports. A CSI-RS is configured to be transmitted by a configuration as different as possible between neighboring cells. Unlike the CRS, the CSI-RS supports maximum 8 antenna ports. According to 3GPP standard document, total 8 antenna ports (antenna port 15 to antenna port 22) are assigned as the antenna port for the CSI-RS. Table 1 and Table 2 in the following show CSI-RS configurations defined by the 3GPP standard document. In particular, Table 1 shows CSI-RS configurations in case of a normal CP and Table 2 shows CSI-RS configurations in case of an extended CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
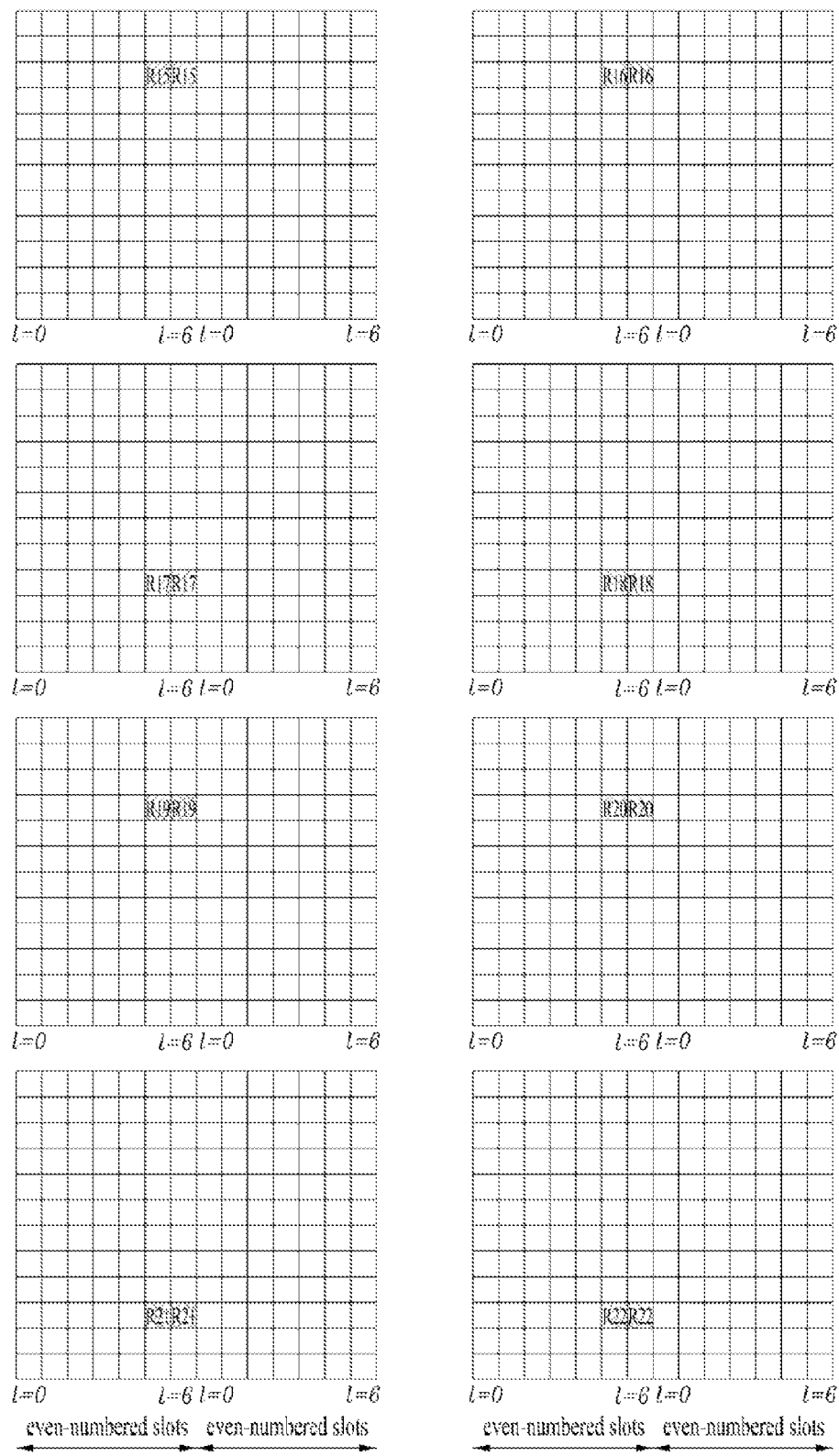
FIG. 11 is a diagram for an example of a CSI-RS configuration #0 in case of a normal CP among downlink CSI-RS configurations defined by a current 3GPP standard document.

In Table 1 and Table 2, (k',l') indicates an RE index, k' indicates an subcarrier index and l' indicates an OFDM symbol index. FIG. 11 shows an example of a CSI-RS configuration #0 in case of a normal CP among CSI-RS configurations defined by current 3GPP standard document.

And, it may define a CSI-RS subframe configuration. The CSI-RS subframe configuration consists of a period ($T_{CSI-RS}$) represented in a subframe unit and a subframe offset ($\Delta_{CSI-RS}$). Table 3 in the following shows CSI-RS subframe configurations defined by 3GPP standard document.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

The present invention proposes a method of efficiently performing channel state information (CSI) feedback in uplink and downlink of a system to which a massive MIMO scheme capable of including a plurality of input/output antennas and a multi-dimensional antenna structure is applied.

A next generation wireless communication system considers introduction of an active antenna system (AAS). Unlike a legacy passive antenna of which an amplifier capable of controlling a phase and a size of a signal and an antenna are separated from each other, an active antenna may mean that each antenna is configured to include an active element such as an amplifier. The active antenna system does not need to have a separate cable to connect an amplifier with an antenna, a connector, other hardware and the like and is highly efficient in terms of energy and management cost. In particular, since the active antenna system supports an electronic beam control scheme according to each antenna, the active antenna system enables a user to implement an advanced MIMO technology such as forming a delicate beam pattern in consideration of a beam direction and a beam width, forming a 3 dimensional beam pattern and the like.

As such an advanced antenna system as an active antenna is introducing, a massive MIMO structure including a plurality of input/output antennas and a multi-dimensional antenna structure is also considered. As an example, if a 2 dimensional antenna array is formed instead of a legacy straight antenna array (or 1 dimensional antenna array), a 3 dimensional beam pattern can be formed using an active antenna of an active antenna system.

Figure 12:
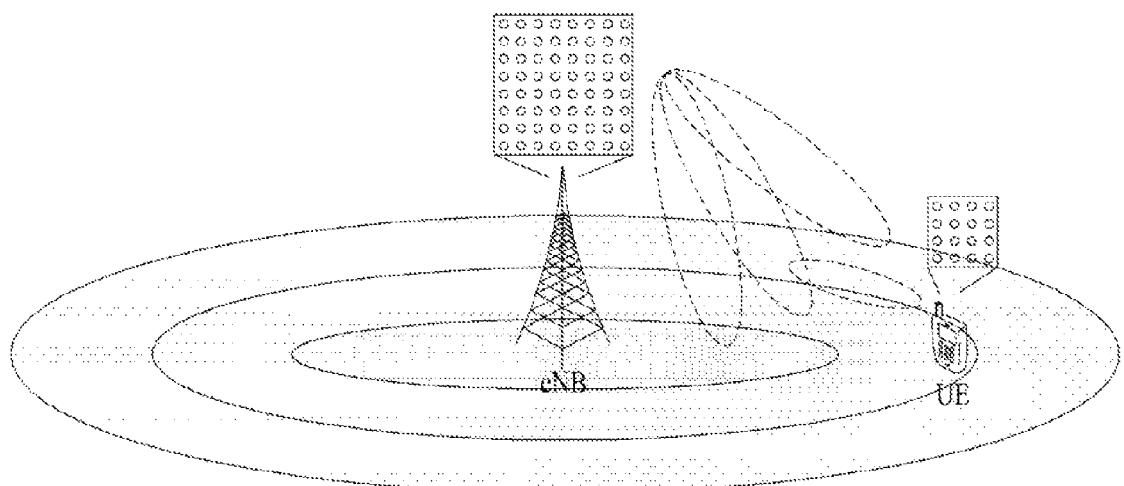
FIG. 12 is a conceptual diagram for a massive MIMO technology.

FIG. 12 is a conceptual diagram for a massive MIMO technology. In particular, FIG. 12 shows a system of an eNode B (eNB) or a user equipment (UE) including a plurality of transmission/reception antennas capable of forming a 3 dimensional (hereinafter abbreviated 3D) beam based on an active antenna system.

Referring to FIG. 12, when a 3D beam pattern is utilized in terms of a transmission antenna, semi-static beam forming or dynamic beam forming can be performed not only in a horizontal direction of a beam but also in a vertical direction of the beam. And, such an application as forming a sector in the vertical direction and the like can be considered. In terms of a reception antenna, in case of forming a reception beam by utilizing a massive reception antenna, it may expect a signal power increasing effect according to an antenna array gain.

Hence, in case of an uplink, an eNB can receive a signal transmitted from a UE via a plurality of antennas. In this case, the UE can configure transmit power of the UE to be very low to reduce interference impact in consideration of a gain of the massive reception antenna.

In the following, antenna virtualization used for applying a massive MIMO technology is explained.

Figure 13:
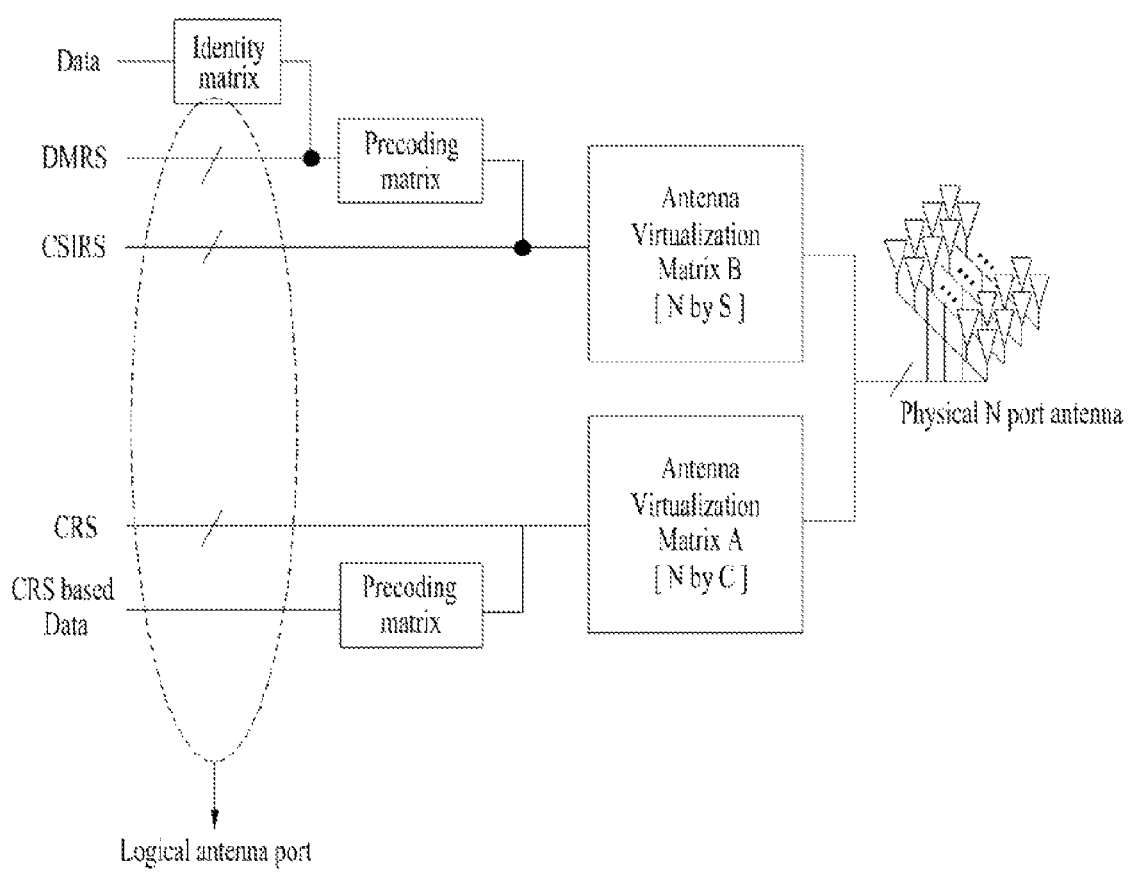
FIG. 13 is a diagram for a concept of antenna virtualization.

FIG. 13 is a diagram for a concept of antenna virtualization. In particular, FIG. 13 shows that a CSI-RS uses the S number of antenna ports and a CRS uses the C number of antenna ports. Assume that an antenna virtualization matrix B for the CSI-RS is UE-specifically defined and an antenna virtualization matrix A for the CRS is identically defined for all UEs.

Referring to FIG. 13, when a CSI-RS is given by $x=[x_1 \, x_2 \, \ldots \, x_S]^T$, a signal after antenna virtualization can be represented as $z=[z_1 \, z_2 \, \ldots \, z_N]^T = B \cdot x$. When a CRS is given by $y=[y_1 \, y_2 \, \ldots \, y_C]^T$, a signal after antenna virtualization can be represented as $z=[z_1 \, z_2 \, \ldots \, z_N]^T = A \cdot y$.

And, as shown in the following Formula 8, a transmission signal of a final antenna can be transmitted in a manner of applying time delay different from each other according to a transmission signal of each antenna to apply frequency-selective antenna virtualization.

$$z=[z_1(t-\tau_1) z_2(t-\tau_2) \ldots z_N(t-\tau_N)]^T \quad \text{[Formula 8]}$$

In this case, it is preferable to configure the antenna virtualization matrix B to make energy of a signal received by a corresponding UE become maximum and the antenna virtualization matrix B should be determined depending on a position of a UE and the like according to a UE. In order to define the antenna virtualization matrix B, an SRS can be utilized based on channel symmetry between an uplink and a downlink. In order to track an optimized antenna virtualization matrix B according to a position change of a UE, channel environment change and the like, it may use an SRS, previously reported CSI feedback information and the like.

In order to implement a massive MIMO scheme such as an active antenna system, the present invention explains a CSI feedback method for a closed-loop 3D MIMO beam forming utilizing a panel antenna.

Figure 14:
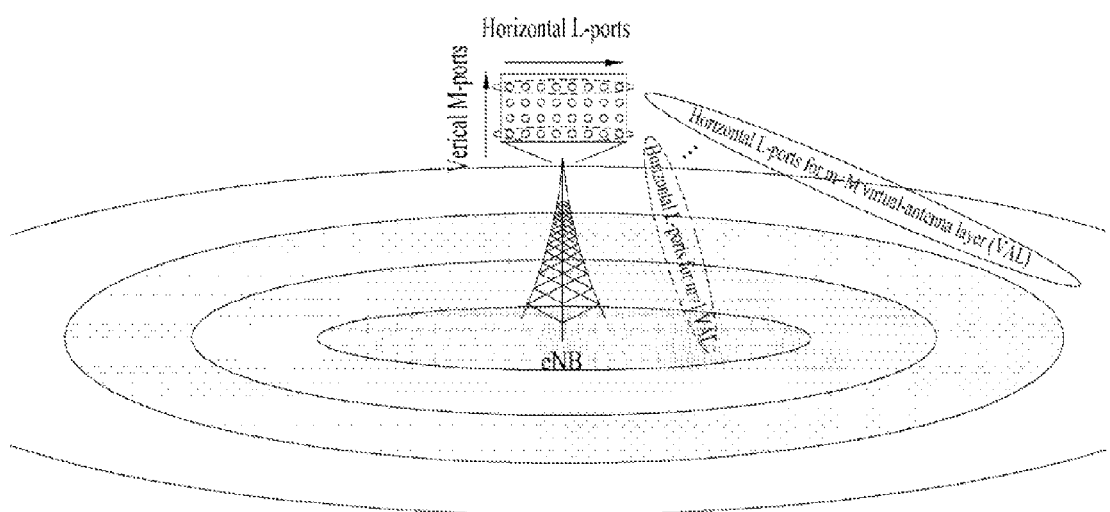
FIG. 14 is a diagram for a concept of 3 dimensional MIMO beamforming according to the present invention.

FIG. 14 is a diagram for a concept of 3 dimensional MIMO beamforming according to the present invention. In particular, in FIG. 14, assume that there exist the L number of antenna ports in a horizontal direction and the M number of antenna ports in a vertical direction as antennas of an eNB. In particular, assume that there exists a structure of L*M panel antennas. In this case, the L number of antenna ports and the M number of antenna ports may correspond to physical antenna ports or logical antenna ports represented by an antenna virtualization matrix.

Yet, for clarity, an example that L corresponds to 8 and M corresponds to 4 is shown in FIG. 14. In particular, this structure corresponds to an 8*4 panel antenna structure. Signals delivered from the total 32 antenna ports form a beam in horizontal direction and a vertical direction and enable 3D MIMO transmission to be implemented.

Specifically, before the L number of antenna ports configured in a horizontal direction deliver signals from the total N=L*M number of antenna ports, which exist on a first PAL (physical antenna layer), a second PAL, . . . , an $M^{th}$ PAL, respectively, as shown in an example of FIG. 13, if a specific antenna virtualization matrix is applied, a beam of the signals delivered from the L number of the antenna ports in horizontal direction can be gathered into a specific single layer among a first VAL (virtual antenna layer), a second VAL, . . . , an $M^{th}$ VAL.

Hence, the L number of antenna ports in VAL m=1 may correspond to the L number of antenna ports targeting a first VAL. In general, the L number of antenna ports in VAL m=M may correspond to the L number of antenna ports targeting an $M^{th}$ VAL. And, if an eNB defines L-port CSI-RS configuration, L-port CSI-RS configuration targeting the first VAL and L-port CSI-RS configuration targeting the $M^{th}$ VAL may be different from each other.

1. As shown in FIG. 14, when an active antenna system capable of forming a 3D beam is implemented in an eNB, it may consider a scheme of configuring the M number of L-port CSI-RSs, which are optimized in every VAL and pre-coded in a vertical direction different from each other (or, a specific virtualization matrix B is applied) as operations of legacy UEs. In this case, the legacy UE corresponds to an UE incapable of recognizing that an antenna of the eNB is an antenna of the aforementioned panel antenna structure. A reception antenna of the UE is not the antenna of the panel antenna structure as well.

In this case, as shown in FIG. 14, precoding an L-port CSI-RS in a vertical direction means that a specific directional property is formed in advance by multiplying each CSI-RS sequence of the M number of antennas in vertical direction by a specific factor instead of transmitting a corresponding CSI-RS sequence to each of the L number of antenna ports as it is in case that an eNB transmits the L-port CSI-RS in a horizontal direction.

In particular, as shown in FIG. 14, a beam in a direction almost verticality is formed according to a configuration of the M number of factor values in vertical direction. When the beam arrives at the ground, the beam can be concentrated on an area of a ring shape closest to an eNB. This can be regarded as transmission of an L-port CSI-RS pre-coded in vertical direction to be optimized to a first VAL.

Or, if a high-rise building and the like are positioned at a location close to an eNB, the beam almost verticality can be actually concentrated on an area as high as a first floor of the building. And, in case of a beam targeting a ring area positioned at an area farthest from the eNB, if the building is positioned at an area close to the eNB, the beam can be actually concentrated on an area of a higher floor of the building. In the following description, such a terminology as a vertical direction may indicate a direction that a sort of a tilting angle of the eNB is electronically adjusted to target a specific VAL according to application of the specific M number of factors.

To this end, the eNB generates the total M number of L-port CSI-RSs, which are pre-coded in vertical direction and optimized to each of a first VAL, a second VAL, . . . , an $M^{th}$ VAL, according to each VAL and can transmit the L-port CSI-RSs in a manner of including the L-port CSI-RSs in a resource management set. A legacy UE can report CSI-RS based RSRP (reference signal received power) for each of the total M number of L-port-CSI-RSs included in the resource management set. By doing so, a measurement set can be configured. For instance, a UE 1 performs CSI feedback for an L-port CSI-RS corresponding to a first VAL and a UE2 performs CSI feedback for an L-port CSI-RS corresponding to an $M^{th}$ VAL. In doing so, when a beam in a vertical direction is formed for the legacy UE, the beam may become a delicate beam in a specific direction.

And, in case of the legacy UE, if location information of a UE is able to be anticipated with a high confidence level, a 3D beam forming effect can be UE-transparently provided by configuring a specific L-port CSI-RS optimized to one layer. In this case, it is preferable for the legacy UE to perform rate matching for PDSCH by defining all CSI-RSs of different layers as a ZP (zero power) CSI-RS.

Or, if the confidence level for the location information of the legacy UE is unable to be secured, similar to a legacy scheme, it is able to configure an additional 8-port CSI-RS to form a beam of a wide range including no specific directional property in a vertical direction.

2. In the following, an operation of a UE recognizing that an antenna of an eNB corresponds to an antenna of the aforementioned panel structure is explained.

(1) Similar to the aforementioned 1, it may consider a scheme of configuring the M number of L-port CSI-RSs, which are optimized in every VAL and pre-coded in a vertical direction different from each other (or, a specific virtualization matrix B is applied).

To this end, the eNB generates the total M number of L-port CSI-RSs, which are pre-coded in vertical direction and optimized to each of a first VAL, a second VAL, . . . , an $M^{th}$ VAL, according to each VAL and can transmit the L-port CSI-RSs in a manner of including the L-port CSI-RSs in a resource management set. A UE can report CSI-RS based-RSRP (reference signal received power) for each of the total M number of L-port-CSI-RSs included in the resource management set. By doing so, a measurement set can be configured. Hence, an L-port CSI-RS of a different layer can be configured according to a UE and feedback for the L-port CSI-RS can be performed.

Or, feedback can be performed by calculating such CSI as RI, PMI, CQI and the like optimized to all of L*M panel antennas instead of configuring L-port CSI-RSs (maximum M number) of a plurality of VALs and calculating an independent CSI according to a layer in case of performing CSI feedback for each VAL. Yet, it is necessary to deliver a fact that PDSCH to which a 3D beam forming is applied will be received from the L*M panel antennas in advance via an RRC signal and the like which is an upper layer signal.

To this end, in case that an eNB actually transmits each of the M number of L-port CSI-RSs, the eNB delivers the L-port CSI-RS in a specific PAL only without applying an antenna virtualization matrix and the eNB may not deliver the L-port CSI-RS in a different PAL.

Moreover, although a CSI feedback itself can be individually reported to each of the M number of layers, an optimized CSI feedback can be defined again. In particular, a single CSI feedback optimized to the L*M panel antennas can be defined. For instance, in case of an RI, a size of the RI is defined to be more than 3 bits and can support up to L*M as a maximum rank. Moreover, in case of PMI, it may consider a scheme of reporting the M number of L-Tx PMIs to each layer or a scheme of performing feedback one L-Tx PMI in a horizontal direction and one M-Tx PMI in a vertical direction. In particular, in case of the latter case, it corresponds to a case that an eNB applies a 2 dimensional interpolation using one L-Tx PMI and one M-Tx PMI. In particular, the M-Tx PMI in the vertical direction assumes an M-port CSI-RS in vertical direction, which is defined by selecting a single antenna port from each of the M number of L-port CSI-RS resources configured in a UE, and indicates PMI corresponding to the M-port CSI-RS in vertical direction. Of course, in case of CQI, when the optimized RI/PMI is used, it may calculate a CQI value expected from transmission via the L*M panel antennas.

In addition, although feedback of CSI on the RI, the PMI, the CQI and the like optimized to all of the L*M panel antennas is performed, in case of a sub band CSI reporting, selection of a sub band can be restricted to select a common sub band between layers.

As a CSI feedback, although the feedback is individually reported to each of the M number of layers, it may restrict an RI to be configured as an RI commonly applied between layers. Or, a sub band CSI can be reported to a specific reference layer only. A sub band CSI for a different layer can be reported by a value identical to a value of the specific reference layer or may not be reported. It may consider a method of replacing the sub band CSI for the different layer with different information as well. In addition, it may put a restriction on a period and offset of a CSI-RS corresponding to each layer to be less than a prescribed interval.

(2) Or, it may consider a scheme of configuring a not pre-coded (or a specific precoding is applied) L-port CSI-RS resource in horizontal direction (e.g., one CSI-RS representative of the horizontal direction) and a not pre-coded (or a specific precoding is applied) M-port CSI-RS resource in vertical direction (e.g., one CSI-RS representative of the vertical direction) to a UE by assuming a 2 dimensional interpolation for the L*M panel antennas.

According to the aforementioned scheme, signaling overhead of a network can be minimized. Specifically, in case of measuring a CSI, since legacy UEs are also able to obtain configuration of an L-port CSI-RS in horizontal direction, the network may need to add an M-port CSI-RS in vertical direction only. In particular, the M-port CSI-RS in vertical direction may be considered as a ZP CSI-RS for a legacy UE.

Of course, it is necessary to deliver a fact that PDSCH to which a 3D beam forming is applied will be received from the L*M panel antennas in advance via an RRC signal and the like which is an upper layer signal.

In case of a CSI feedback, an individual CSI report can be performed for each of the L-port CSI-RS in horizontal direction and the M-port CSI-RS in vertical direction. Of course, it may restrict an RI and/or a sub band to be commonly applied to the L-port CSI-RS in horizontal direction and the M-port CSI-RS in vertical direction. Moreover, it may restrict a period and an offset for each direction to be less than a prescribed interval.

Or, it may restrict feedback of M-Tx PMI of a rank 1 to be performed only for the M-port CSI-RS in vertical direction. In particular, if feedback of the M-Tx PMI in vertical direction is performed in a state of being restricted by the rank 1, this sort of PMI can be applied in vertical direction in case of transmitting a next PDSCH.

Or, an optimized single CSI can be defined for the L*M panel antennas. For instance, in case of an RI, a size of the RI is defined to be more than 3 bits and can support up to L*M as a maximum rank. Moreover, in case of PMI, it may consider a case of calculating a final PMI by making an eNB apply a 2 dimensional interpolation in a manner that a UE reports one L-Tx PMI and one M-Tx PMI.

There may exist an example of connecting a 2 dimensional interpolation with one L-Tx PMI (H-PM) and one M-Tx PMI (V-PM) using a Knonecker product operator $\otimes$. Specifically, if the H-PM corresponds to a rank 8 and the V-PM corresponds to a rank 2, it may assume that a size of a panel antenna becomes L=8 (horizontal) and M=4 (vertical). In particular, it may assume that the total 32 antennas are installed. Hence, a final PM can be represented as Formula 9 in the following.

$$[V\text{-}PM] \otimes [H\text{-}PM] = [PM] \qquad \text{[Formula 9]}$$
$$(4\times2) \qquad (8\times8) \qquad (32\times16)$$

Of course, in case of performing 2 dimensional interpolation for two matrixes using the Knonecker product operator or a different scheme, it is necessary to share the aforementioned connection scheme with each other between an eNB and a UE. Of course, in case of CQI, when the optimized RI/PMI is used, it may calculate a CQI value expected from transmission via the L*M panel antennas.

Of course, in case of configuring an L-port CSI-RS resource in horizontal direction and an M-port CSI-RS resource in vertical direction, a UE may individually perform a CSI report for each of M number of layers of the L*M panel antennas. Of course, it may restrict an RI and/or a sub band to be commonly applied to the L-port CSI-RS in horizontal direction and the M-port CSI-RS in vertical direction. Moreover, it may restrict a period and an offset for each direction to be less than a prescribed interval. In particular, in case of the sub band, a sub band CSI for a different layer can be reported by a value identical to a value of the specific reference layer or may not be reported. It may consider a method of replacing the sub band CSI for the different layer with different information as well.

(3) Lastly, RSRP according to an antenna port or an average power value according to an antenna port of a specific type can be reported as many as M by configuring an M-port CSI-RS resource (e.g., one CSI-RS) in vertical direction, which is randomized in horizontal direction, with a long-term period. By doing so, a factor of a vertical beam can be determined with a long-term period, i.e., semi-statically. On the contrary, CSI feedback in horizontal direction can be performed in a manner of signaling a not pre-coded (or a specific precoding is applied) L-port CSI-RS resource (e.g., one CSI-RS) in horizontal direction with a short term period.

In this case, the M-port CSI-RS resource in vertical direction randomized in horizontal direction means to randomize a beam in a horizontal direction by randomly selecting a beam coefficient in horizontal direction, which is different from each other according to an RB or such a specific frequency resource unit as a PRG (precoding resource block group), and applying the selected beam coefficient to a CSI-RS sequence.

The aforementioned scheme is less complex than the aforementioned (2) in that a vertical direction is used for the purpose of semi-static switching only and CSI feedback in horizontal direction is performed as usual after the switching.

Having received the M-port CSI-RS in vertical direction, which is randomized in horizontal direction, a UE compares energy gathered into a single RE (if CDM (code division multiplexing) scheme is applied to a CSI-RS sequence, two or more REs) according to each antenna port in vertical direction with each other and may be able to select an antenna port in vertical direction of big energy. Or, in case that the CDM is not applied, it is able to make the UE compare energy gathered into each CSI-RS with each other by transmitting the total M number of one-port CSI-RSs in vertical direction, which is randomized in horizontal direction, in a manner of transmitting a single one-port CSI-RS to each layer as many as M times. Or, in case that the CDM is applied and the one-port CSI-RS is code division multiplexed into the n number of REs, a single one-port CSI-RS in vertical direction, which is randomized in horizontal direction, is transmitted to each layer as many as M times (total M number of one-port CSI-RSs). The UE descrambles the CSI-RSs, which are received in each of the n number of REs in a manner of being code division multiplexed, and may be then able to compare energy with each other, which is gathered according to a CSI-RS.

On the contrary, the UE may basically perform short-term L-Tx CSI feedback and legacy L-Tx CSI feedback in an identical manner. Yet, in case that an eNB receives the CSI feedback and actually transmits PDSCH to the UE, the eNB also applies a beam in vertical direction, which is semi-statically selected in advance. Hence, CQI itself can be corrected by the eNB. It is necessary for the UE to recognize whether the CQI is corrected by the eNB in advance via RRC signaling, an explicit method via DCI or an implicit method.

Or, the UE selects an RI of 3 bits by over-estimating the RI in consideration of a vertical direction selected by the UE, calculates PMI/CQI according to the RI and may be able to report the PMI/CQI. In particular, the UE calculates the RI, the PMI and the CQI in consideration of the beam in vertical direction, which is semi-statically selected or reported by the UE, and reports the RI, the PMI and the CQI.

Or, the UE can receive specific confirmation information on the beam in vertical direction, which is semi-statically selected or reported by the UE, from the eNB. The UE calculates and reports the RI, the PMI and the CQI in consideration of the beam in vertical direction based on the confirmation information from timing on which the beam in vertical direction is capable of being actually applied.

In addition, the UE can calculate the RI, the PMI and the CQI in consideration of RSRP of a selected antenna port. For instance, after an additional scaling is performed by applying a ratio of an average value of M number of RSRP per each antenna port to the RSRP value of the selected antenna port to $P_c$ (ratio of PDSCH EPRE to CSI-RS EPRE) value, which is informed by an L-port CSI-RS resource in horizontal direction, the RI, the PMI and the CQI can be calculated.

In this case, a result of selecting an antenna port is not separately reported. The result can be reported via combination encoding of an RI or PMI of a long-term period in case of performing L-Tx CSI feedback in horizontal direction. Since the result of selecting an antenna port corresponds to information of a long-term period to be used for beam switching in vertical direction, if the result is transmitted via combination encoding with feedback information of a different long-term period, a resource for a separate reporting can be saved.

Of course, it may also consider additional feedback on rank 1 M-Tx PMI for M-port CSI-RS in vertical direction. In particular, if feedback of the M-Tx PMI in vertical direction is performed in a state of being restricted by the rank 1, this sort of PMI can be applied in vertical direction in case of transmitting a next PDSCH.

The aforementioned schemes proposed by the present invention can be identically or similarly applied to such a different reference signal used for measuring CSI on the L*M panel antennas capable of forming a 3D beam, as a CRS, an SRS, a TRS (tracking RS), a DMRS, a cell-specific reference signal of a different form or a UE-specific reference signal.

Figure 15:
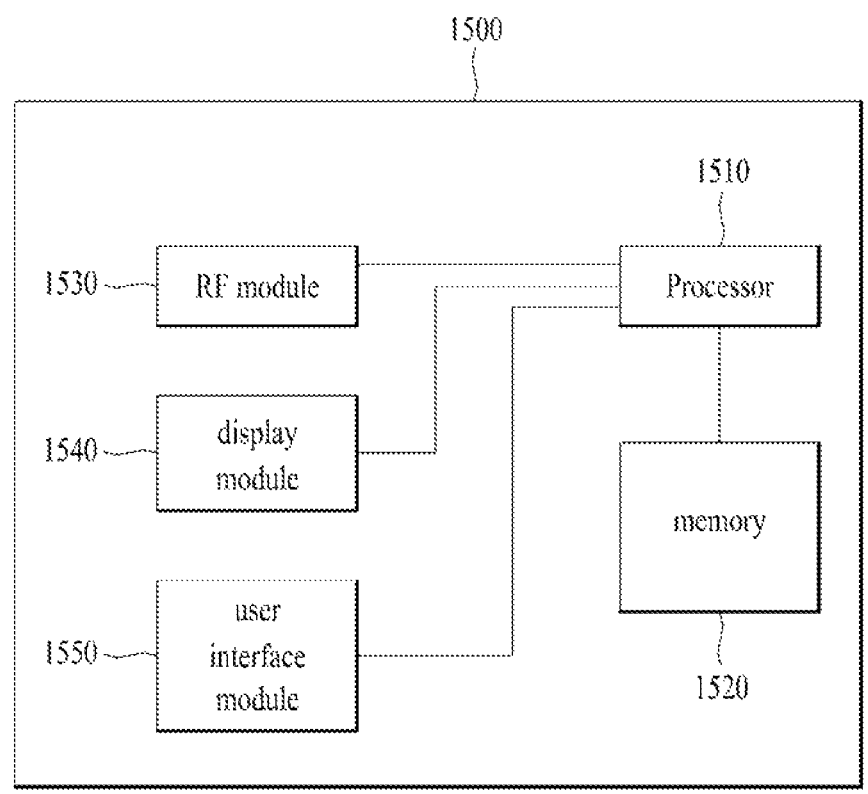
FIG. 15 is a block diagram for an example of a communication device according to one embodiment of the present invention.

FIG. 15 is a block diagram for an example of a communication device according to one embodiment of the present invention.

Referring to FIG. 15, a communication device 1500 may include a processor 1510, a memory 1520, an RF module 1530, a display module 1540, and a user interface module 1550.

Since the communication device 1500 is depicted for clarity of description, prescribed module(s) may be omitted in part. The communication device 1500 may further include necessary module(s). And, a prescribed module of the communication device 1500 may be divided into subdivided modules. A processor 1510 is configured to perform an operation according to the embodiments of the present invention illustrated with reference to drawings. In particular, the detailed operation of the processor 1510 may refer to the former contents described with reference to FIG. 1 to FIG. 14.

The memory 1520 is connected with the processor 1510 and stores an operating system, applications, program codes, data, and the like. The RF module 1530 is connected with the processor 1510 and then performs a function of converting a baseband signal to a radio signal or a function of converting a radio signal to a baseband signal. To this end, the RF module 1530 performs an analog conversion, amplification, a filtering, and a frequency up conversion, or performs processes inverse to the former processes. The display module 1540 is connected with the processor 1510 and displays various kinds of informations. And, the display module 1540 can be implemented using such a well-known component as an LCD (liquid crystal display), an LED (light emitting diode), an OLED (organic light emitting diode) display and the like, by which the present invention may be non-limited. The user interface module 1550 is connected with the processor 1510 and can be configured in a manner of being combined with such a well-known user interface as a keypad, a touchscreen and the like.

FIG. 16 is a diagram illustrating a method for reporting CSI according to one embodiment of the present invention. The method is performed by a UE 1605 supporting massive MIMO technology in a wireless communication system. The UE includes an L×M array 1610. In step S1620, the UE receives, from an eNode B 1615, M port CSI reference signals through a plurality of antenna ports composed of the L×M array 1610, where L corresponds to a number of antenna ports in a horizontal direction and M corresponds to a number of antenna ports in a vertical direction. Each of the M port CSI first reference signals is directed to different vertical directions and is randomized in the horizontal direction with randomly selected horizontal direction beam coefficients. In step S1625, the UE 1605 selects a vertical antenna port by comparing energy of the M port CSI reference signals. In step S1630, the UE 1605 calculates a rank indicator (RI), a precoding matrix indicator (PMI), and a channel quality indicator (CQI) of the selected vertical antenna port based on the M port CSI reference signals. In step S1635, the UE 1605 transmits the calculated RI, the calculated PMI, and the calculated CQI to the eNode B 1615. The calculated RI, the calculated PMI and the calculated CQI are scaled by applying a first ratio to a second ratio. The first ratio is a ratio of average of reference signal received power (RSRP) of the M port CSI reference signals to RSRP of the selected vertical antenna port. The second ratio is a ratio of physical downlink shared channel (PDSCH) energy per resource element (EPRE) to CSI-reference signal.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Although a method of reporting channel state information for a 3D beam forming in a wireless communication system and an apparatus therefor are described with reference to examples applied to 3GPP LTE system, it may be applicable to various kinds of wireless communication systems as well as the 3GPP LTE system.

What is claimed is:

1. A method of reporting channel state information (CSI), by a user equipment (UE) supporting massive multiple-input multiple-output (MIMO) technology in a wireless communication system, the method comprising:
   receiving, from an eNode B by the UE, M port CSI reference signals through a plurality of antenna ports composed of an L×M array,
   wherein L corresponds to a number of antenna ports in a horizontal direction and M corresponds to a number of antenna ports in a vertical direction,
   wherein each of the M port CSI first reference signals is directed to different vertical directions and is randomized in the horizontal direction with randomly selected horizontal direction beam coefficients;

selecting a vertical antenna port by comparing energy of the M port CSI reference signals;

calculating a rank indicator (RI), precoding matrix indicator (PMI), and a channel quality indicator (CQI) of the selected vertical antenna port based on the M port CSI reference signals; and transmitting the calculated RI, the calculated PMI, and the calculated CQI to the eNode B, wherein the calculated RI, the calculated PMI, and the calculated CQI are scaled by applying a first ratio to a second ratio, wherein the first ratio is a ratio of average of reference signal received power (RSRP) of the M port CSI reference signals to RSRP of the selected vertical antenna port, and wherein the second ratio is a ratio of physical downlink shared channel (PDSCH) energy per resource element (EPRE) to CSI-reference signal.

2. The method according to claim 1, further comprising: receiving L port CSI reference signals through the plurality of antenna ports, wherein a period of the M port CSI reference signals is longer than a period of the L port CSI reference signals.

3. The method according to claim 2, wherein the second ratio is obtained from resource of the L port CSI reference signals.

4. The method according to claim 2, wherein the L port CSI reference signals are non-precoded.

5. The method according to claim 2, further comprising: transmitting CSI feedback for the horizontal direction, wherein information of the selected vertical antenna port is jointly encoded with an RI of the CSI feedback.

6. The method according to claim 1, further comprising receiving information on the plurality of antenna ports via a higher layer signal.

7. A user equipment supporting massive multiple-input multiple-output (MIMO) technology in a wireless communication system, the user equipment comprising:

a wireless communication module configured to transceive a signal with an eNode B; and a processor configured to process the signal, wherein the processor is further configured to:

control the wireless communication module to receive, from the eNode B, M port channel state information (CSI) reference signals through a plurality of antenna ports composed of an L×M array, wherein L corresponds to a number of antenna ports in a horizontal direction and M corresponds to a number of antenna ports in a vertical direction, and wherein each of the M port CSI reference signals is directed to different vertical directions and is randomized in the horizontal direction with randomly selected horizontal direction beam coefficients represents the first direction and the second reference signal represents the second direction, select a vertical antenna port by comparing energy of the M port CSI reference signals, calculate a rank indicator (RI), precoding matrix indicator (PMI), and a channel quality indicator (CQI) of the selected vertical antenna port based on the M port CSI reference signals, and transmit the calculated RI, the calculated PMI, and the calculated CQI to the eNode B, wherein the calculated RI, the calculated PMI, and the calculated CQI are scaled by applying a first ratio to a second ratio, wherein the first ratio is a ratio of average of reference signal received power (RSRP) of the M port CSI reference signals to RSRP of the selected vertical antenna port, and wherein the second ratio is a ratio of physical downlink shared channel (PDSCH) energy per resource element (EPRE) to CSI-reference signal.

8. The user equipment according to claim 7, wherein the processor is further configured to control the wireless communication module to receive L port CSI reference signals through the plurality of antenna ports, and wherein a period of the M port CSI reference signals is longer than a period of the L port CSI reference signals.

9. The user equipment according to claim 8, wherein the second ratio is obtained from resource of the L port CSI reference signals.

10. The user equipment according to claim 8, wherein the L port CSI reference signals are non-precoded.

11. The user equipment according to claim 7, wherein the processor is further configured to control the wireless communication module to transmit CSI feedback for the horizontal direction, and wherein information of the selected vertical antenna port is jointly encoded with an RI of the CSI feedback.

12. The user equipment according to claim 7, wherein the processor is further configured to control the wireless communication module to receive information on the plurality of antenna ports via a higher layer signal.

* * * * *